United States Patent [19]

Scala

[11] Patent Number: 4,698,500

[45] Date of Patent: Oct. 6, 1987

[54] METHOD AND APPARATUS FOR DETERMINING CLAY COUNTER-ION CONCENTRATION IN SHALY SANDS

[75] Inventor: Carl Scala, Mountain View, Calif.

[73] Assignee: Halliburton Company, Duncan, Okla.

[21] Appl. No.: 739,742

[22] Filed: May 31, 1985

[51] Int. Cl.$^4$ .............................................. G01V 5/06
[52] U.S. Cl. .................................. 250/256; 250/253; 250/265
[58] Field of Search .................... 250/253, 256, 265

[56] References Cited

U.S. PATENT DOCUMENTS

| | | | |
|---|---|---|---|
| 3,336,476 | 8/1967 | Richardson | 250/256 |
| 3,786,267 | 1/1974 | Liu et al. | 250/256 |
| 3,940,610 | 2/1976 | Dennis et al. | 250/253 |
| 4,021,666 | 5/1977 | Allen | 250/265 |
| 4,071,755 | 1/1978 | Supernaw et al. | 250/253 |
| 4,180,730 | 12/1979 | Givens et al. | 250/265 |
| 4,585,939 | 4/1986 | Arnold et al. | 250/256 |

Primary Examiner—Janice A. Howell
Assistant Examiner—David Porta
Attorney, Agent, or Firm—William J. Beard

[57] ABSTRACT

The uranium and thorium count rates from a fluid bearing shaly sand reservoir are normalized to the formation porosity and then, by a direct correlation, used to obtain the clay counter-ion concentration of the formation.

4 Claims, 3 Drawing Figures

METHOD AND APPARATUS FOR DETERMINING CLAY COUNTER-ION CONCENTRATION IN SHALY SANDS

BACKGROUND OF THE INVENTION

The present invention rolates to methods and apparatus for logging earth formations penetrated by a well borehole, and more particularly to improved methods and apparatus for determining formation characteristics by the analysis of the formation conductivity.

The clay counter-ion concentration is well recognized as an important factor in the interpretation of the resistivity of shaly sands. See, for example, Waxman, M. H. and Smits, L. J. M. "Electrical Conductivities in Oil-Bearing Shaly Sands". Soc. Pet. Eng. J. (June, 1968), presented as Paper (SPE 1863-A) at SPE 42nd Annual Fall Meeting, Houston, Tex., Oct. 1–4, 1967; and Clavier, C., Coates, G., and Dumanoir, J. "The Theoretical and Experimental Bases for the 'Dual Water' Model for the Interpretation of Shaly Sands", Soc. Pet. Eng. J. (October 1977), presented as Paper (SPE 6859) at SPE 52nd Annual Fall Meeting, Denver, Colo. Oct. 9–12, 1977. As explained therein, because the clay counter-ions aug-ment or supplement the conductivity of the formation water, it is necessary to correct electrical formation measurements for the added clay counter-ion conductivity. Such corrections prevent overestimation of the formation fractional water saturation $S_w$.

As presently understood, the counter-ion conductivity provided by such clay mineral classes as illite, kaolinite, and smectites results from large insoluble anions which are captive in the clay particles, and whose negative charges are counterbalanced by soluble mobile cations (which are the counter-ions). ("Large" in this context is with respect to the size of the mobile cation, although a clay mineral particle size of 2 microns would also be small relative to the normal grain size.) The negative charges in the clay are believed to occur from substitution of bi-valent atoms (e.g., Mg or Fe) for tri-valent Al in the clay lattice, or from cyrstal defects in the clay lattice. This creates a local electrical unbalance which is compensated by positive ions, or counter-ions, at the surface of the clay. The resulting positive surface charge is called the clay cation exchange capacity (CEC). The CEC is expressed on a weight basis in milli-equivalent (meq) per 100 grams of dry material.

The well recognized Waxman-Smits (W-S) model (see above references) for rock conductivity may be expressed as:

$$C_t = \phi^m S_w^n (C_w + BQ_v) \tag{1}$$

where:
$\phi^m$ and $S_w^n$ have their usual Archie relationship meaning,
$C_t$ is the true conductivity of the formation,
$C_w$ is the conductivity of producible pore water,
B is the counter-ion mobility, and
$Q_v$ is the counter-ion concentration (CEC)

$$Q_v = \frac{CEC}{100} \left( \frac{1 - \phi_t}{\phi_t} \right) \rho g$$

Pg = matrix density.
The $BQ_v$ term is the conductivity added to the system by the clay. From this expression the need to correct the electrical measurements for added clay counter-ion conductivity is self-evident.

Various methods are known for determining the term $Q_v$, such as correlation with classical shale indicators. Clavier, Coates, and Dumanoir (supra) state that gamma ray and SP logs have been found especially useful for estimating $Q_v$, and mention one study which found a strong correlation between gamma-ray count rate/$\phi_t$ and $Q_v$ (see FIG. 2 of the present invention disclosure).

Clays are hydrous alumino-silicate sheet minerals. Illite is the only one which incorporates potassium in its structure. The other naturally radioactive elements (uranium and thorium) are associated in some other way with clays and shales, but potassium does not constitute a part thereof. In fact, since potassium can be present in the rock matrix itself (as distinguished from the clays and shales), in the form of feldspar and mica, for example, excessive clay may be indicated if radiation from potassium is considered. Alternatively, some clays (kaolinite, for example) can be terribly deficient in potassium, leading to errors in the opposite direction. In short, as now recognized and taught herein, potassium can be dangerous to use as a $Q_v$ indicator.

A need therefore remains for a method and apparatus which will provide for determining the clay counter-ion concentration in a fluid bearing shaly sand formation, preferably by measuring the formation natural gamma-ray radiation without being affected by perturbations introduced by unrelated variations in the potassium content of the clays, shales, and other formation constitutents. The method and apparatus should furnish such measurements in an inexpensive, uncomplicated, durable, versatile, and reliable method and apparatus, which are inexpensive to manufacture and utilize, and readily suited to the widest possible utilization in logging earth formations penetrated by a well borehole, to determine the formation characteristics.

SUMMARY OF THE INVENTION

Briefly, the present invention meets the above needs and purposes with a method and apparatus for determining the clay counter-ion concentration in a fluid bearing shaly sand formation using only a measure of the gamma ray radiation attributable to the uranium and thorium in the formation. As described more fully below, it has been found that the sum of the uranium (U) and thorium (Th) counting rates, normalized for porosity, correlate very well with $Q_v$. Simply put:

$$UTh/\phi = kQ_v \tag{2}$$

where k is an appropriate constant of proportionality which may be determined experimentally.

Thus, in the interpretation of the formation conductivity of fluid bearing shaly sand reservoirs, the method and apparatus according to the present invention begin by obtaining, with a borehole measurement system, a gamma ray energy spectrum measurement. From this gamma ray measurement a determination is made of the count rates attributable to uranium and thorium in the formation. These count rates are normalized to the amount of rock in the formation, for example by dividing the count rates by the porosity $\phi$ of the formation. Then the clay counter-ion concentration is determined as a predetermined function of the normalized uranium and thorium count rates. In the preferred embodiment, the clay counter-ion concentration is determined as a predetermined ratio of the sum of the normalized uranium and thorium count rates, such as set forth in equation (2) above.

It is therefore a feature of the present invention to provide an improved method and apparatus for logging earth formations penetrated by a well borehole, and more particularly to provide improved methods and apparatus for determining the characteristics of such formations by the analysis of formation conductivity; such a method and apparatus which will provide for determining the clay counter-ion concentration in a fluid bearing shaly sand formation, preferably by measuring the formation natural gamma-ray radiation; in which such measurements will be unaffected by perturbations introduced by unrelated variations in the postassium content of the clays and shales; in which a determination is made of the formation gamma ray count rates attributable to the uranium and thorium in the formation; in which these uranium and thorium count rates are then normalized to the porosity of the formation; in which the clay counter-ion concentration in the formation is then determined as a predetermined function of the normalized uranium and thorium count rates; and to accomplish the above features and purposes in an inexpensive, uncomplicated, durable, versatile, and reliable method and apparatus, inexpensive to manufacture, and readily suited to the widest possible utilization in the measurement of earth formation characteristics.

These and other features and advantages of the invention will be apparent from the following description, the accompanying drawings, and the appended claims.

DESCRIPTION OF THE PREFERRED EMBODIMENT

With reference to the drawings, the new and improved method and apparatus for logging earth formations penetrated by a well borehole and for determining the characteristics of such formations by the analysis of formation conductivity according to the present invention will now be described.

Figure 1:
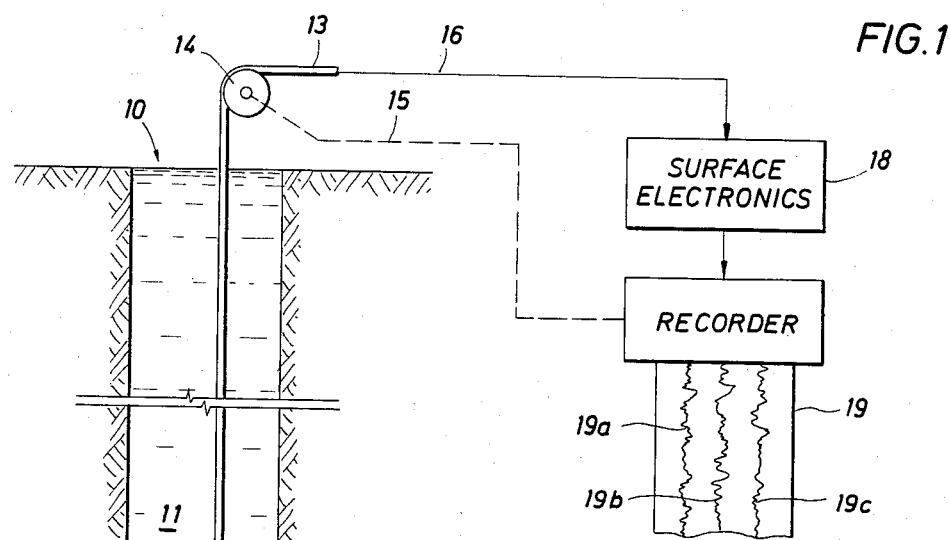
FIG. 1 is a schematic illustration showing a well logging system according to the principles of the present invention.

Referring to FIG. 1, a well logging system in accordance with the concepts of the present invention is illustrated schematically. A well borehole 10, which is filled with a borehole fluid 11, penetrates the earth formations 20 under investigation. A downhole well logging sonde 12 is suspended in the borehole 10 via a conventional armored logging cable 13, in a manner known in the art, whereby the sonde 12 may be raised and lowered through the borehole as desired. The well logging cable 13 passes over a sheave wheel 14 at the surface. The sheave wheel is electrically or mechanically coupled, as indicated by dotted line 15, to a well logging recorder 18 which may comprise an optical recorder, or magnetic tape, or both, as known in the art. Recorder 18 is shown making a record on a conventional paper chart 19 having curves 19a, 19b, and 19c, for example, recorded thereon. The record of measurements made by the downhole sonde 12 may thus be recorded as a function of the depth in the borehole of the sonde 12.

Data signals generated by sonde 12 travel within the sonde through a sonde communication line 24 to a communication and control link 25, and are then telemetered thereby to the surface via a conductor 16 in the well logging cable 13. At the surface, a surface electronics package 17 detects the telemetered information from the downhole sonde 12 and performs suitable processing, by methods known in the art, to determine the measured quantities. These are then supplied to the recorder 18, where, as indicated, they are recorded as a function of borehole depth.

The downhole sonde 12, as illustrated herein, is comprised of two sections: a natural gamma ray measuring portion 30, and a porosity measuring portion 40. These are illustrated in FIG. 1 as comprising a single tool string, whereby all the measurements are made simultaneously as the sonde 12 is moved through borehole 10 by cable 13. It will be understood, of course, that these measurements may be made independently and at different times with separate tools or tool sections, and that additional measurement sections may alternatively be added to sonde 12 in order simultaneously to make additional measurements, as may be desired and appropriate.

It will be appreciated that for the purposes of the present invention the components in portions 30 and 40 may be of types known in the art. All that is required to perform the preferred embodiment of the invention is that reliable natural gamma ray and porosity data be obtained. Therefore, sections 30 and 40 need not be described in particular detail.

Equation (2) states the basic relation taught by the present invention. As discussed above, the particular advantage of the present invention is that the natural gamma ray radiation of the formation can be used to determine the clay counter-ion concentration $Q_v$ without the perturbing effects of potassium. It remains to show that the uranium and thorium concentrations are sufficient for identifying the clay counter-ion concentration.

Figure 2:
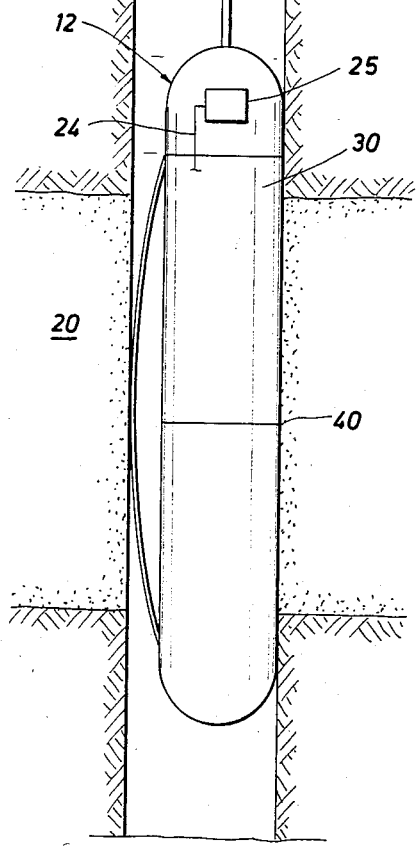
FIG. 2 is a graphical cross-plot illustrating the correlation between total gamma-ray count rate and $Q_v$.
Figure 2:
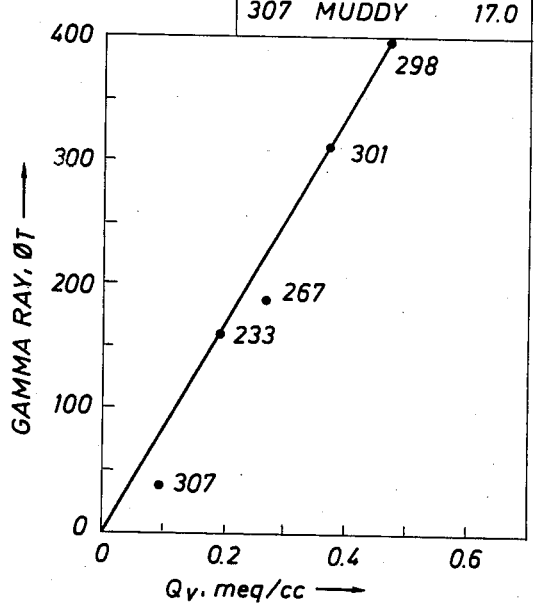
Figure 3:
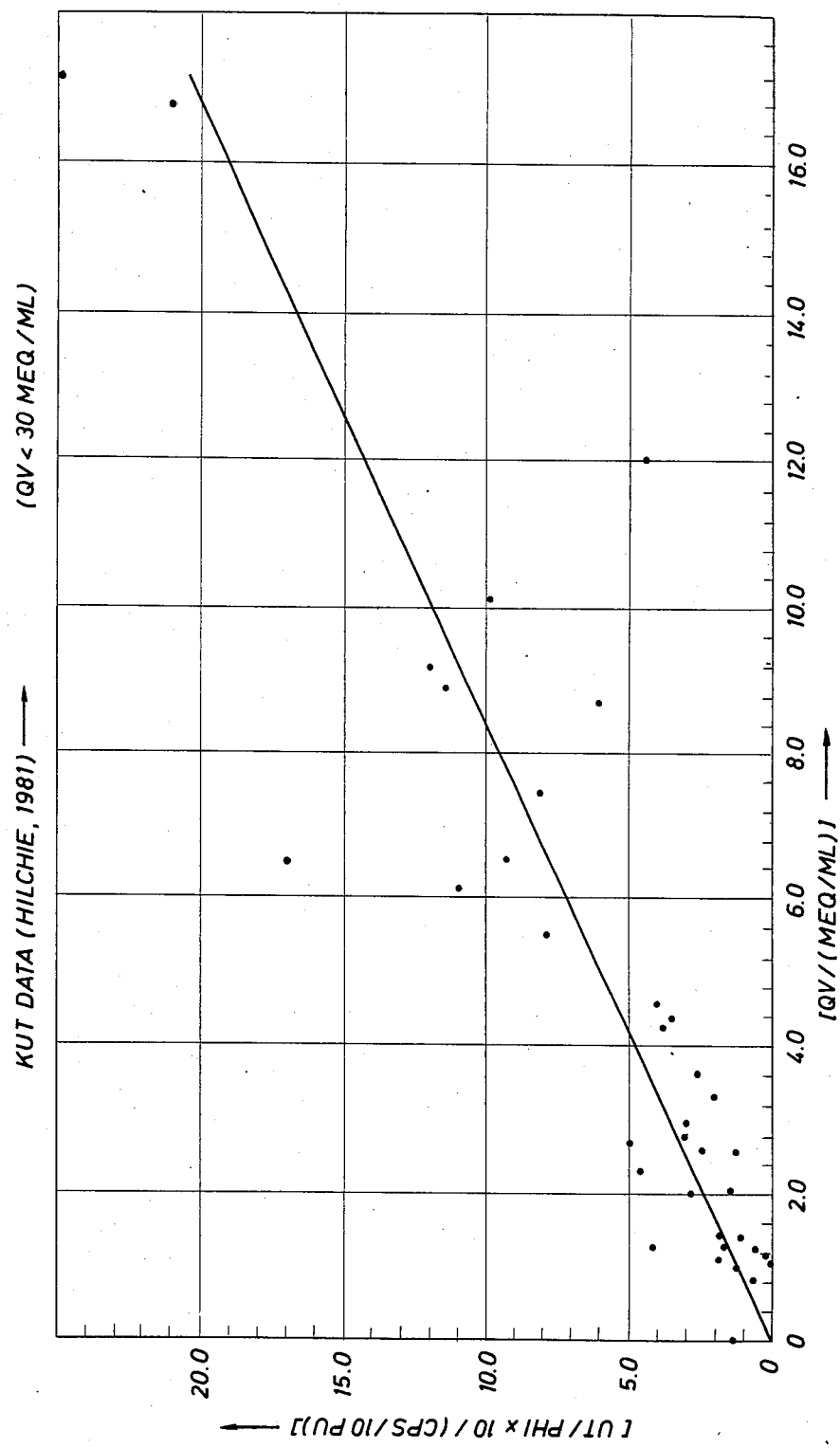
FIG. 3 is a graphical cross-plot illustrating the correlation between just the uranium and thorium gamma-ray count rates and $Q_v$.

One authority (Adams, "Geochemistry of Thorium on Uranium", Physics and Chemistry of the Earth, Vol. 3) has concluded that uranium and thorium are present in clay and shales as "silt and sub-silt size" resistate minerals, zircon and monazite. FIGS. 2 and 3 suggest that this may not be true, at least in certain formations. The near-zero intercept suggests that the U-Th activity is associated with the ion exchange process, or structurally with the minerals which undergo ion-exchange. Whichever model is accepted, however, the thorium ion $Th^{+3}$ and the uranium ion $(U_2O_5)^{+2}$ and its completes, which are the ones most likely to be present in most formations, are multi-valent and hence preferentially absorbed or exchanged on the clays. Therefore, the exact mechanism (Adams, or ion exchange) is not necessarily important. Either way there is a correlation between $UTh/\phi$ and $Q_v$, and this correlation can therefore be used according to the present invention.

FIG. 3 shows a regression analysis of Table I data from Hilchio (Log: Analyst Vol. 22, 1981). As may be seen, there is a significant difference between $KUTh/\phi$ and $UTh/\phi$. This is important since, as discussed above, potassium may vary, while here it is shown that UTh alone can be used to determine $Q_v$.

Other evidence supports the preference for UTh taught by the present invention. For example, in following smectite to illite clay diagenesis on the Gulf Coast, Perry & Hower (Clay and Clay Miner. 16, 1970) noted significant changes in clay type, but found little variation in total potassium. Thus the potassium not only is not a sensitive indicator, but could in fact tend to mask clay type changes. Also, as indicated above, potassium also occurs in sedimentary rocks as micas and K-feldspare. (These minerals are thought to supply the potassium needed in the clay conversion.) Such formation potassium can seriously perturb the potassium signal thought to be originating in the clay.

As may be seen, therefore, the present invention provides numerous advantages. Principally, it furnishes a significantly improved method and apparatus for determining the clay counter-ion concentration in a fluid bearing shaly sand formation, by using only the uranium and thorium gamma-ray count rates and/or concentrations. Perturbations and reduced sensitivities caused by variations in potassium concentration, unrelated to the clay counter-ion concentration, are therefore eliminated. The invention is accurate, inexpensive and uncomplicated to implement, and readily suited to utilization with a wide variety of borehole logging instruments and data. For example, it can be correlated or cross-plotted with other clay indicators, such as ST or neutron response, to help identify and eliminate non-clay sources of radioactivity. the value of $Q_v$ thus obtained can then be used, as taught herein, to correct formation conductivity measurements.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for determining, in situ, clay counter-ion concentrations in a fluid bearing shaly sand earth formation penetrated by a well borehole, comprising the steps of:
    (a) detecting in a well borehole at a particular depth level natural gamma radiation emanating from the earth formations penetrated by the borehole as count rate signals and separating said detected gamma radiation signal into an energy spectrum of naturally occurring gamma radiation count rate signals as a function of energy and generating signals representative of said energy spectrum of said count rates of naturally occurring gamma radiation at said particular depth level;
    (b) comparing said representative count rate signals with a plurality of standard gamma ray energy spectra representative of natural radioactive elements found in the earth formations penetrated by a well borehole and thereby separating out gamma ray count rates attributable to at least uranium U, thorium Th, and potassium K occurring in the earth formations;
    (c) measuring the porosity $\phi$ of the earth formation at said particular depth level and normalizing the count rates attributable to uranium U and thorium Th at said particular depth level by forming a ratio of the sum of count rates attributable to uranium U and thorium Th divided by the porosity $\phi$ at said particular depth level, given by:

$$\text{Ratio} = \text{UTh}/\phi$$

(d) determining the clay counter ion concentration $Q_v$ of the earth formations at said particular depth level by using a predetermined functional relationship relating the Ratio of step (c) to clay counter-ion concentration $Q_v$ and obtaining a signal representative of $Q_v$ at said particular depth level; and,
    (e) recording said representative clay counter-ion concentration $Q_v$ signal as a function of borehole depth.

2. The method of claim 1 wherein the steps are performed repetitively as a function of borehole depth and a log of the clay counter ion $Q_v$ representative signals are recorded as a function of borehole depth.

3. The method of claim 2 and further including the steps of recording signals representative of uranium U, thorium Th and potassium K as a function of borehole depth.

4. The method of claim 3 and further including the steps of recording signals representative of porosity $\phi$ as a function of borehole depth.

* * * * *